(12) United States Patent
Rabinovich et al.

(10) Patent No.: US 7,595,031 B2
(45) Date of Patent: Sep. 29, 2009

(54) PLASMA REFORMER WITH EXTENDED VOLUME DISCHARGE

(75) Inventors: Alexander Rabinovich, Swampscott, MA (US); Andrei Samokhin, Moscow (RU); Nikolai Alexeev, Moscow (RU); Alexander Peschkoff, London (GB)

(73) Assignee: Nanoenergy Group (UK), Mayfair, London (GB)

( * ) Notice: Subject to any disclaimer, the term of this patent is extended or adjusted under 35 U.S.C. 154(b) by 841 days.

(21) Appl. No.: 11/330,515

(22) Filed: Jan. 12, 2006

(65) Prior Publication Data
US 2007/0160511 A1 Jul. 12, 2007

(51) Int. Cl.
*B01J 19/08* (2006.01)

(52) U.S. Cl. ............................ 422/186.04; 422/186.21; 123/3

(58) Field of Classification Search ............ 422/186.04, 422/186.21; 123/3
See application file for complete search history.

(56) References Cited

U.S. PATENT DOCUMENTS

| 4,020,388 A | * | 4/1977 | Pratt, Jr. ....................... 315/58 |
| 5,444,208 A | * | 8/1995 | Mortensen ............. 219/121.48 |
| 6,881,386 B2 | | 4/2005 | Rabinovich et al. .... 422/186.04 |
| 2005/0210877 A1 | | 9/2005 | Rabinovich et al. ........... 60/643 |

* cited by examiner

*Primary Examiner*—Kishor Mayekar
(74) *Attorney, Agent, or Firm*—Choate Hall & Stewart LLP; Sam Pasternack

(57) ABSTRACT

Plasma reformer having a high voltage electrode spaced apart from a grounded electrode creating a volume therebetween. At least one electrically floating electrode is disposed between the high voltage electrode and the grounded electrode and a fuel atomizer is disposed to inject a hydrocarbon fuel into the volume. Structure is provided for introducing air into the volume and a high voltage source establishes a high voltage between the high voltage electrode and grounded electrode to create a cascade arc in the volume. The electrically floating electrodes increase the arc length and the discharge volume to create a cascade arc having a combined extended length and increased contact time with an air-fuel mixture for reforming a hydrocarbon fuel.

17 Claims, 2 Drawing Sheets

PLASMA REFORMER WITH EXTENDED VOLUME DISCHARGE

BACKGROUND OF THE INVENTION

This invention relates to a plasma reformer for reforming a hydrocarbon fuel into a hydrogen-rich gas, and more particularly to a plasma reformer having an extended volume arc discharge.

Plasma reformers for converting a hydrocarbon fuel into a hydrogen-rich gas are well known. Such devices are often referred to as plasmatrons. In a plasmatron, a hydrocarbon fuel and air interact with an arc discharge which results in chemical reactions to reform the fuel.

U.S. Pat. No. 6,881,386 of which some of the inventors of the present application are co-inventors, teaches a plasmatron that efficiently uses electrical energy to produce a hydrogen-rich gas. In this patent, a high voltage, low current discharge works as a volumetric igniter of an air-fuel mixture providing a fast start of reactions of combustion, partial oxidation and fuel vaporization. The '386 patent includes two electrodes separated by an electrical insulator and disposed to create a gap so as to form a discharge volume for receiving the fuel-air mixture. A high voltage in the range 300V-60 kV is applied to the electrodes to create an arc between the electrodes. The arc is then stretched by air until extinction and immediately created again at a different location. The arc can not be stretched very far beyond the gap between the two electrodes because the plasma's electric field becomes unsustainable due to diminishing vorticity, current limitations and discharge shunting. A typical voltage within the arc is in the range of 1-2 kV that indicates a short arc length.

The relatively short residence time of the air-fuel mixture (at an O/C ratio of 1-1.8 for a partial oxidation reaction) in the discharge zone leads to the preferential development of a complete combustion reaction instead of a desired partial oxidation reaction. As a result, the hydrogen concentration in the hydrogen-rich gas and its heating value decreases.

To elaborate, because of the limited time that the air-fuel mixture (at an O/C ratio of 1-1.8) is in contact with a high temperature discharge, a portion of the fuel is completely combusted to $CO_2$ and $H_2O$ instead of being reformed to $CO$ and $H_2$. The $CO_2$ and $H_2O$ compounds can further react with the remaining hydrocarbons according to the reaction:

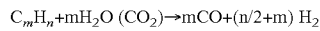

$$C_mH_n + mH_2O\ (CO_2) \rightarrow mCO + (n/2+m)\ H_2$$

This reaction is endothermic and its speed is much slower compared to complete combustion and partial oxidation (POX) reactions:

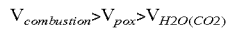

$$V_{combustion} > V_{pox} > V_{H2O(CO2)}$$

In order to preferentially achieve the POX reaction, it would be advantageous to increase the residence time of the air-fuel mixture (at an O/C ratio of 1-1.8) in the high temperature zone of the volumetric arc discharge. An extended time for the interaction of the air-fuel mixture with the high temperature (up to approximately 5,000 degrees C) plasma arc will create active radicals, improve mixing and provide continual initiation of the desired partial oxidation reaction instead of complete combustion. This extended time of the interaction can lead to complete non-catalytic partial oxidation of the hydrocarbon fuel. An alternative way to achieve the same goal is to treat the same air-fuel mixture with several consecutively positioned plasmatrons but that would be complicated and expensive.

An object of the present invention, therefore, is to increase residence time of the air-fuel mixture in a high temperature plasma zone leading to the efficient production of a hydrogen-rich gas.

SUMMARY OF THE INVENTION

According to one aspect, the invention is a plasma reformer including a high voltage electrode spaced apart from a grounded electrode creating a volume therebetween. At least one electrically floating electrode is disposed between the high voltage and the grounded electrodes and a fuel atomizer is disposed to inject a hydrocarbon fuel into the volume. Structure is provided for introducing air into the volume and a high voltage source establishes a high voltage between the high voltage electrode and the grounded electrode to create a cascade arc in the volume to cause a partial oxidation reaction to reform the fuel. In a preferred embodiment, the high voltage is greater than 5 kV and it is preferred that the high voltage be in the range of 10-20 kV. Preferred embodiments include one, two or three electrically floating electrodes but it is noted that any number of such electrodes can be used.

In another preferred embodiment, the structure for introducing the air into the volume creates swirl that rotates the cascade arc. In this embodiment, the air is injected tangentially with respect to the volume through gaps between the electrodes. The hydrocarbon fuel and air are introduced to result in an oxygen/carbon (O/C) ratio to support partial oxidation. A suitable O/C ratio is the range of 1 to 1.8.

In yet another preferred embodiment, the structure for introducing air to create swirl injects the air in opposite directions. In yet another embodiment, a portion of the air is injected radially into the volume and another portion is injected tangentially into the volume to create an extended volume discharge. In this embodiment, the tangentially injected portion enters the volume through a region surrounding the fuel atomizer.

In still another embodiment, the structure for introducing the air injects the air radially into the volume for low turbulence and laminar flow operation.

The present invention thus makes it possible to increase arc length and discharge volume by inserting the electrically floating electrodes between the high voltage and grounded electrodes. In this way, a cascade arc is created having a combined extended length and thus increased contact time with the air-fuel mixture.

DESCRIPTION OF THE PREFERRED EMBODIMENT

Figure 1:
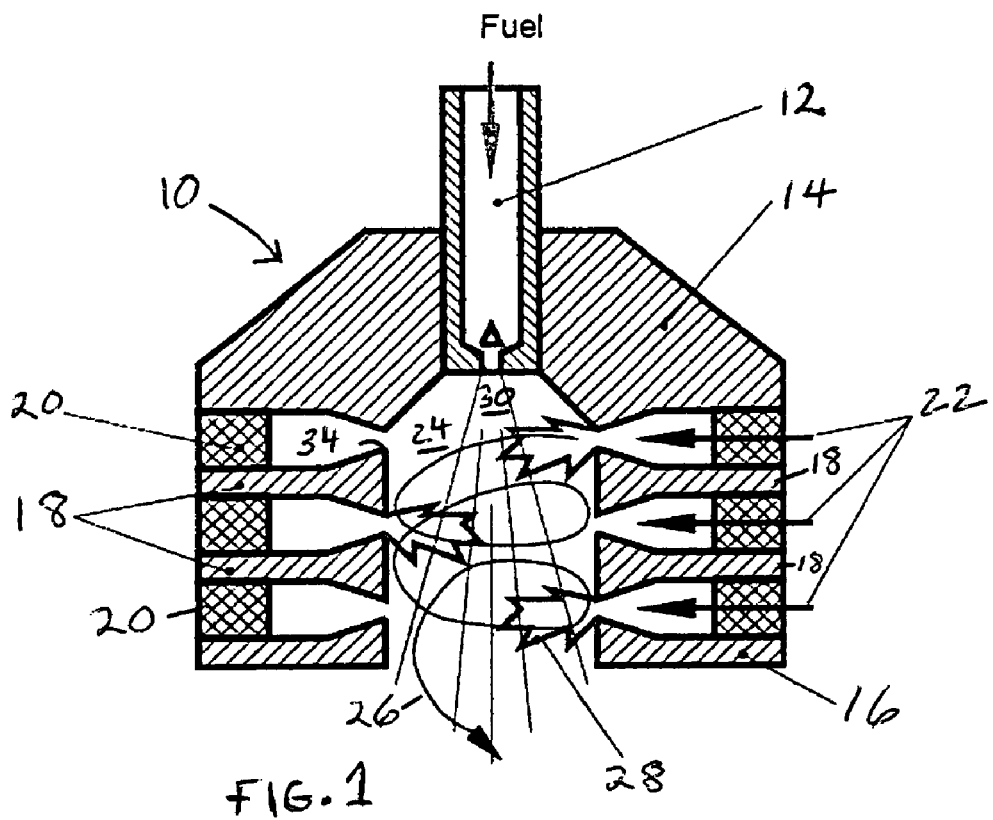
FIG. 1 is a cross-sectional view of an embodiment of the invention disclosed herein.

With reference first to FIG. 1, a plasma reformer 10 includes a fuel atomizer 12 that injects a hydrocarbon fuel into a volume created by high-voltage electrode 14 spaced apart from a grounded electrode 16. In this embodiment, electrically floating electrodes 18 are disposed between the high voltage electrode 14 and the grounded electrode 16. Insulators 20 separate the electrodes. The arrangement of the electrodes 14, 16, and 18 creates gaps through which air 22 flows into a volume 24 within the plasma reformer 10. In this embodiment, the air is injected tangentially to create swirl as indicated by the path 26.

In operation, a high voltage, for example in the range of 300V-15 kV or higher, is applied between the high voltage electrode 14 and the grounded electrode 16. The high voltage creates a cascade electric arc 28 that rotates because of the tangentially injected plasma air 22. The electrically floating electrodes 18 aid in the production of an extended volume discharge. Atomized fuel 30 is injected from the fuel atomizer 12 into the volume 24 so that oxygen/carbon ratio is suitable for a partial oxidation reaction (a ratio usually between 1 and 1.8). The atomized hydrocarbon fuel undergoes an intense plasma chemical treatment in the extended volume discharge.

Experiments with plasma reformers including the electrically floating electrodes indicated an increase in arc length and a corresponding increase in voltage to 4-5 kV instead of the 1-2 kV at the same plasma air flow rate as in the prior art. It is to be noted that in order to create a maximum turbulence and to increase volume filling by the arc, the plasma air 22 may be injected tangentially in opposite directions (clockwise and counter-clockwise) in the gaps between the electrodes.

Figure 2:
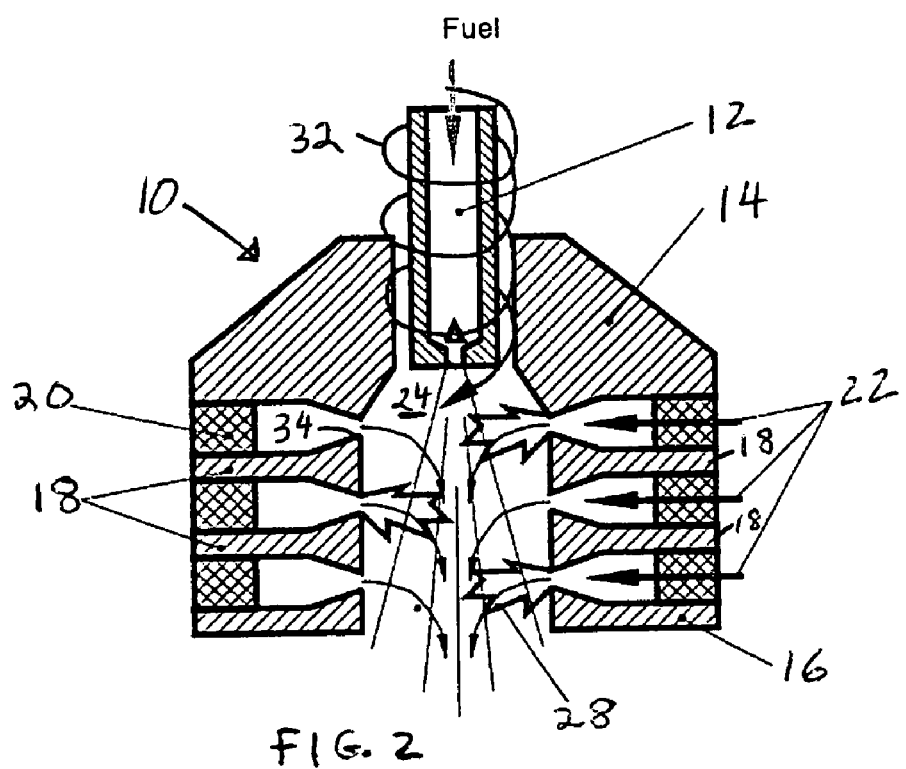
FIG. 2 is an embodiment of the invention disclosed herein utilizing both swirl flow air and radial flow air.

Another embodiment of the invention is shown in FIG. 2. This embodiment is designed for situations when additional fine fuel atomization is required (for example, for some heavy viscous fuels, such as diesel, bio-oils, or crude oil). In this embodiment, the plasma air 22 is injected radially into the volume 24 and additional atomization air 32 is injected tangentially around the fuel atomizer 12, thereby creating an extended volume discharge within the volume 24.

Figure 3:
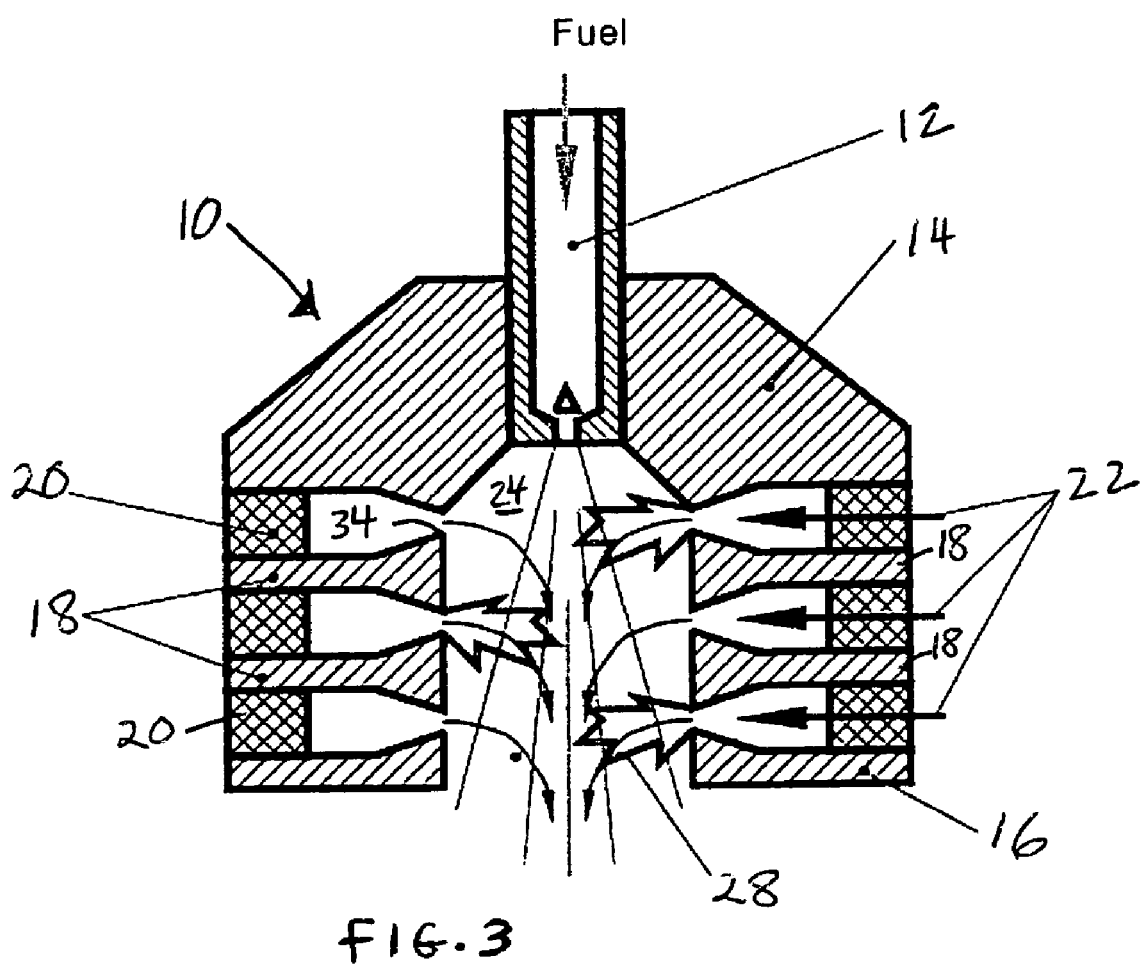
FIG. 3 is a cross-sectional view of another embodiment of the invention utilizing radial flow air.

Yet another embodiment of the invention is shown in FIG. 3. The embodiment of the FIG. 3 will be utilized when low turbulence and laminar flow are required (for example, for an "incomplete pyrolysis" mode of operation). In this mode the air flow rate could be decreased to a minimal value thereby providing high enthalpy for fuel vaporization and "incomplete pyrolysis" at an O/C ratio less than one. In this embodiment, plasma air 22 is injected radially into the volume 24 and the cascade arc 28 appears every time in a different place.

In any of the embodiments described above, conditions for discharge initiation can be improved and breakdown voltage minimized by having the electrically floating electrodes 18 be made as sharp pointed needles positioned radially around the volume 24. Alternatively, thin ring-like electrodes 18 may be made with razor-sharp edges 34. These electrode configurations also serve the purpose of decreasing the surface available for potential soot deposition.

It is recognized that modifications and variations of the invention will be apparent to those of ordinary skill in the art and it intended that all such modifications and variations be included within the scope of the appended claims.

What is claimed is:
1. Plasma reformer comprising:
 a high voltage electrode spaced apart from a grounded electrode creating a volume therebetween;
 at least one electrically floating electrode disposed between the high voltage electrode and the grounded electrode;
 a fuel atomizer disposed to inject a hydrocarbon fuel into the volume;
 structure for introducing air into the volume; and
 a high voltage source for establishing a high voltage between the high voltage electrode and the grounded electrode to create a cascade arc in the volume.

2. The plasma reformer of claim 1 wherein the high voltage is greater than 300V.

3. The plasma reformer of claim 2 wherein the high voltage is in the range of 10-20 kV.

4. The plasma reformer of claim 1 including two electrically floating electrodes.

5. The plasma reformer of claim 1 including three electrically floating electrodes.

6. The plasma reformer of claim 1 wherein the structure for introducing the air creates swirl that rotates the cascade arc.

7. The plasma reformer of claim 6 wherein the air is injected tangentially with respect to the volume through gaps between the electrodes.

8. The plasma reformer of claim 6 wherein the air is injected through gaps between electrodes in opposite directions.

9. The plasma reformer of claim 1 wherein the hydrocarbon fuel and the air have an oxygen/carbon (O/C) ratio to support partial oxidation.

10. The plasma reformer of claim 9 wherein the O/C ratio is in the range of 1 to 1.8.

11. The plasma reformer of claim 1 wherein the hydrocarbon fuel and air have an oxygen/carbon (O/C) ratio to support incomplete pyrolysis.

12. The plasma reformer of claim 11 wherein the O/C ratio is in the range of 0.05 to 1.

13. The plasma reformer of claim 1 wherein the electrically floating electrodes are formed as sharp pointed needles positioned radially around the volume.

14. The plasma reformer of claim 1 wherein the electrically floating electrodes are in the form of a ring with razor sharp edges.

15. The plasma reformer of claim 1 wherein a portion of the air is injected radially into the volume and another portion is injected tangentially into the volume to create an extended discharge.

16. The plasma reformer of claim 15 wherein the tangentially injected portion of air enters the volume through a region surrounding the fuel atomizer.

17. The plasma reformer of claim 1 wherein the structure for introducing the air injects the air radially into the volume for low turbulence and laminar flow operation.

* * * * *